(12) United States Patent
Shibuya I et al.

(10) Patent No.: US 7,896,626 B2
(45) Date of Patent: Mar. 1, 2011

(54) ELECTRIC PUMP

(75) Inventors: Yukio Shibuya I, Tokyo (JP); Satomi Uchiyama, Tokyo (JP); Takanori Suzuki, Tokyo (JP)

(73) Assignee: Minebea Co., Ltd. (JP)

( * ) Notice: Subject to any disclaimer, the term of this patent is extended or adjusted under 35 U.S.C. 154(b) by 457 days.

(21) Appl. No.: 11/017,766

(22) Filed: Dec. 22, 2004

(65) Prior Publication Data

US 2005/0214135 A1 Sep. 29, 2005

(30) Foreign Application Priority Data

Mar. 26, 2004 (JP) ................................. 2004-092947

(51) Int. Cl.
*F04D 13/06* (2006.01)
*F04D 1/00* (2006.01)

(52) U.S. Cl. ...................... 417/423.7; 417/365; 417/366; 310/86; 310/87; 310/90

(58) Field of Classification Search ............... 417/423.7, 417/366; 310/86
See application file for complete search history.

(56) References Cited

U.S. PATENT DOCUMENTS

| 2,117,011 | A | * | 5/1938 | Pratt | 415/211.1 |
|---|---|---|---|---|---|
| 2,942,555 | A | * | 6/1960 | Pezzillo | 417/372 |
| 4,784,574 | A | * | 11/1988 | Tsuno et al. | 416/241 B |
| 4,806,080 | A | * | 2/1989 | Mizobuchi et al. | 417/353 |
| 6,293,772 | B1 | * | 9/2001 | Brown et al. | 417/420 |
| 2001/0033800 | A1 | * | 10/2001 | Deai et al. | 417/370 |
| 2003/0210995 | A1 | * | 11/2003 | Hokkirigawa et al. | 417/423.12 |

FOREIGN PATENT DOCUMENTS

| DE | 1 802 561 | | 10/1968 |
|---|---|---|---|
| DE | 4111541 | | 10/1992 |
| DE | 44 34 448 A1 | | 9/1994 |
| DE | 29503198 | | 5/1995 |
| EP | 0 281 818 | | 2/1988 |
| GB | 1 320 841 | | 1/1971 |
| GB | 1320841 | * | 6/1973 |
| JP | 05-010286 | | 7/1991 |
| JP | 8-082297 | | 3/1996 |
| JP | 8-296580 | | 11/1996 |
| JP | 9-317684 | | 12/1997 |
| JP | 2001-317482 | | 11/2001 |
| JP | 2003-301788 | | 10/2003 |
| JP | 2003-314485 | | 11/2003 |
| JP | 2003-343481 | | 12/2003 |
| JP | 2004-003611 | | 1/2004 |
| JP | 2004-36532 | | 2/2004 |

* cited by examiner

*Primary Examiner* — Devon C Kramer
*Assistant Examiner* — Philip Stimpert
(74) *Attorney, Agent, or Firm* — Bacon & Thomas, PLLC

(57) ABSTRACT

An electric pump uses an inner-rotor type, brushless DC motor. A casing of the electric pump is formed by a pump casing and a main casing. A sensor-stator assembly is disposed in a space between a side wall portion of the main casing and a can and is sealed with resin. A first elastic seal member is disposed, in a fluid-tight manner, between the can and the main casing. A second elastic seal member is disposed, in a fluid-tight manner, between the pump casing and the main casing. In this condition, the pump casing and the main casing are fixed together.

10 Claims, 5 Drawing Sheets

ELECTRIC PUMP

BACKGROUND OF THE INVENTION

1. Field of the Invention

The present invention relates to an electric pump, and more particularly, to an electric pump mounted on a vehicle and used for supplying or circulating, for example, cooling water, fuel, or oil.

2. Description of the Related Art

Conventionally, a pump mounted on a vehicle is driven through transmission of rotation of a pulley attached to a rotary shaft of an engine, to a pulley attached to a rotary shaft of the pump via a belt. Since the pump is driven via the belt, the pump must be installed in an extremely limited location near the engine. Since many components, including the engine, are disposed within the small space of the engine compartment, restrictions are imposed on the shape of the pump and the installation space therefor. Therefore, there has been a problem in that the restricted arrangement of the pump within the engine room lowers the degree of freedom in design.

Further, a mechanical pump, which has conventionally been used as a pump for vehicles, employs a shaft seal structure. That is, such a mechanical pump requires a shaft seal, which causes problems such as generation of mechanical loss, leakage, and short service life.

In view of such problems, there has been proposed use of an electric pump in which, in place of an engine, an electric motor is used as a drive source. In one example configuration, the shaft of an impeller is rotated by means of an electric motor, and an O-ring seal is provided in order to realize a fluid-tight structure for the shaft. In another configuration, a magnetic coupling is interposed between the shaft of an impeller and the rotary shaft of an electric motor. However, these configurations bring about problems such as an increase in the overall length, necessity of secure maintenance of seal members, necessity of securing following operation of the coupling, and necessity of additional components such as a cover.

In such an electric pump, a brush type electric motor or an outer-rotor type electric motor is employed. The brush type electric motor inherently has the problem of wear of brushes and generation of sliding noise. The outer-rotor type electric motor has a problem in that when it is configured for use in water by being provided with submerged bearings, the area of contact between the rotor and fluid increases, with a resultant increase in loss caused by fluid (e.g., water loss).

In view of the foregoing, there has been developed an electric pump which can secure fluid tightness and decrease the number of components. This electric pump includes rotor magnets fixedly disposed at uniform angular intervals around a shaft, which is common with an impeller; a casing having a portion surrounding the rotor magnets, wherein at least that portion is formed of a non-magnetic material; and a stator disposed to surround the rotor magnets via the casing and adapted to generate a rotating magnetic field (see Japanese Patent Application Laid-Open (kokai) No. H5-010286. FIG. 5 shows a cross sectional view of the conventional electric pump.

Since the stator is isolated from the rotor magnets of the pump by means of the casing, the fluid tightness of the pump can be reliably maintained. Moreover, since the stator, by its very nature, does not have a rotating portion, its operation is not adversely affected by debris or dust.

As shown in FIG. 5, a hub 104 is fixed to a shaft 103 of an impeller 102; and a plurality of permanent magnets; i.e., rotor magnets 105, disposed at uniform angular intervals about the shaft 103 are fixed to the periphery of the hub 104. The shaft 103 is rotatably supported by means of bearings 111 and 112 fixedly disposed within a casing 101.

Meanwhile, the stator is provided so as to surround the rotor magnets 105 via the casing 101. The stator includes a core 106, and a coil 107 wound around the magnetic poles of the core 106. At least a portion of the casing 101 sandwiched between the rotor magnets 105 and the stator is formed of a non-magnetic material such as resin in order to prevent induced current from flowing.

In the electric pump shown in FIG. 5, the thickness of the casing 101 must be reduced in order to produce a strong magnetic attractive/repelling force between the rotor magnets 105, and the core 106 having the coil 107 wound thereon. However, the casing 101 must have sufficient strength (e.g., thickness) for attachment of the core 106 having the coil 107 and journalling of the rotor. Moreover, the casing 101 must have a thickness greater than a predetermined value in order to resist water pressure generated by means of the impeller 102. Moreover, since at least a portion of the casing 101 must be formed of a non-magnetic material such as resin, reducing the thickness of the casing is difficult. Therefore, a restriction is imposed on the magnetic coupling action between the rotor magnets 105 and the core 106 having the coil 107, and consequently the formed electric motor has poor rotation characteristics. Further, the bearing 111 produces an irregular flow of fluid; i.e., generates vortexes, thereby lowering the efficiency of the pump. The electric motor is of an AC type.

SUMMARY OF THE INVENTION

In view of the foregoing, an object of the present invention is to provide an electric pump in which a casing has a reduced wall thickness in order to produce a strong magnetic attractive/repelling force between rotor magnets and a stator core having a coil winding thereon; in which a shaft for a rotor is supported in such a manner as to produce a smooth flow of fluid; and which has a compact overall configuration.

In order to achieve the above object, the present invention employs the following means for solution.

The present invention mainly employs a canned structure including a can and a seal for realizing a fluid-tight structure; an integral structure of impeller vanes and a rotor main body; an integral structure of the impeller vanes and an impeller cover; a cantilever support structure for the shaft; potting molding for the coils; formation of a canned structure through potting; a cap nut for imparting a hemispherical shape to the end of the shaft to thereby regulate flow of fluid; a vent hole in the rotor main body; an inner-rotor type, brushless DC motor; a coolant-resistant material for the casing; submerged-type ceramic bearings; means for equalizing the impeller diameter with that of the rotor main body to thereby reduce an occupation space; surface treatment of the shaft for a plain bearing; means for positioning, bonding, and preventing the magnet and a yoke from separating from the rotor main body; and a material for the shaft so as to make the shaft hard and slidable.

Specifically, the present invention provides the following.

(1) An electric pump using an inner-rotor type, brushless DC motor, wherein a casing of the electric pump is formed by a pump casing and a main casing; a sensor-stator assembly is disposed in a space between a side wall portion of the main casing and a can and is sealed with resin; a first elastic seal member is disposed, in a fluid-tight and compressed manner, between the can and the main casing; a second elastic seal member is disposed, in a fluid-tight and compressed manner, between the pump casing and the main casing; and the pump casing and the main casing are fixed together.

(2) In the electric pump described in (1) above, the can is formed of a non-magnetic resin, a non-magnetic steel material, or both of these materials, and has a wall thickness and elasticity such that the can press the first and second elastic seal members for establishing fluid tightness, and can press and hold the sensor-stator assembly.

(3) In the electric pump described in (1) above, a bearing of the inner-rotor type, brushless DC motor is a submerged-type ceramic bearing which exhibits a lubrication effect when immersed in a coolant.

(4) In the electric pump described in (3) above, the submerged-type ceramic bearing is formed of silicon nitride, silicon carbide, alumina, or rice bran ceramic.

(5) In the electric pump described in (3) above, a shaft support portion is provided on a bottom plate portion of the main casing in such manner that the shaft support portion projects toward the center of the interior of the main casing; a support shaft portion of a shaft is fixed to a blind hole formed in the shaft support portion; and the bearing is provided on a slide shaft portion of the shaft.

(6) In the electric pump described in (5) above, the shaft is formed of a material selected from the group consisting of nickel-chromium-molybdenum steel, DD material, ASK 8000, SUS303, SUJ2.

(7) In the electric pump described in (5) above, the surface of the shaft is treated with hard chrome plating, nitriding treatment, titanium carbide coating, titanium nitride coating, titanium aluminum nitride coating, or diamond-like carbon coating.

(8) In the electric pump described in (1) above, impeller vanes are integrally provided on a rotor main body of the inner-rotor type, brushless DC motor.

(9) In the electric pump described in (8) above, the impeller vanes are connected together by an impeller cover.

(10) In the electric pump described in (8) above, a vent hole is formed in the rotor main body, the vent hole penetrating the rotor main body in a direction parallel to the shaft.

(11) In the electric pump described in (8) above, a cylindrical yoke and a cylindrical magnet are integrally fitted onto an annular stepped portion of the rotor main body; and an end cover is fitted onto the yoke and the magnet so as to prevent the magnet and the yoke from separating from the rotor main body.

The electric pump having the above-described structural features provides the following effects.

(1) Use of an inner-rotor type, brushless DC motor eliminates drawbacks which would otherwise arise because of use of a conventional brush type DC motor, and greatly reduces the area of contract with fluid, as compared with the case of an outer-rotor type, whereby water loss can be reduced.

(2) Since a canned structure is realized by making use of a can and a seal (a fluid-tight structure is realized by making use of a can), desired electric isolation can be attained irrespective of use of a submerged-type plain bearing.

(3) Since the bearing utilizes a lubricating effect of fluid such as a coolant, a conventionally-employed shaft seal can be eliminated, mechanical loss stemming from friction can be eliminated, and satisfactory sliding performance can be maintained for a long time.

(4) Since the impeller vanes and the rotor main body are integrated and the impeller vanes and the impeller cover are integrated if necessary, the size of the pump, including the motor, can be reduced.

(5) Since the shaft is cantilevered, a bearing portion does not have to be provided at an inlet nozzle portion of the pump casing, which has been provided in conventional electric pumps, whereby flow lines of fluid can be rendered smooth to thereby improve the efficiency of the pump.

(6) Use of a cap nut having a hemispherical head portion smoothes flow lines of fluid taken into the pump.

(7) The ratio (diameter ratio) of the diameter of the rotor main body to that of the impeller preferably is set to fall within the range of about 50% to about 100%. Preferably, the diameter ratio is set to about 100%. This setting reduces the height of the electric pump, to thereby reduce the volume of the electric pump.

(8) Provision of the vent hole in the rotor main body reduces thrust load produced on the basis of the pressure difference between opposite ends of the vent hole.

(9) Two submerged-type plain bearings, which utilize the lubricating effect of a coolant, are fixedly provided in the impeller rotor while being separated in the axial direction. This structure eliminates the necessity of a shaft seal, suppresses fluid leakage and mechanical loss, and extends service life.

Other actions and effects will be described in the description of a preferred embodiment of the present invention.

DESCRIPTION OF THE PREFERRED EMBODIMENT

An electric pump according to an embodiment of the present invention will now be described with reference to the drawings.

Figure 1:
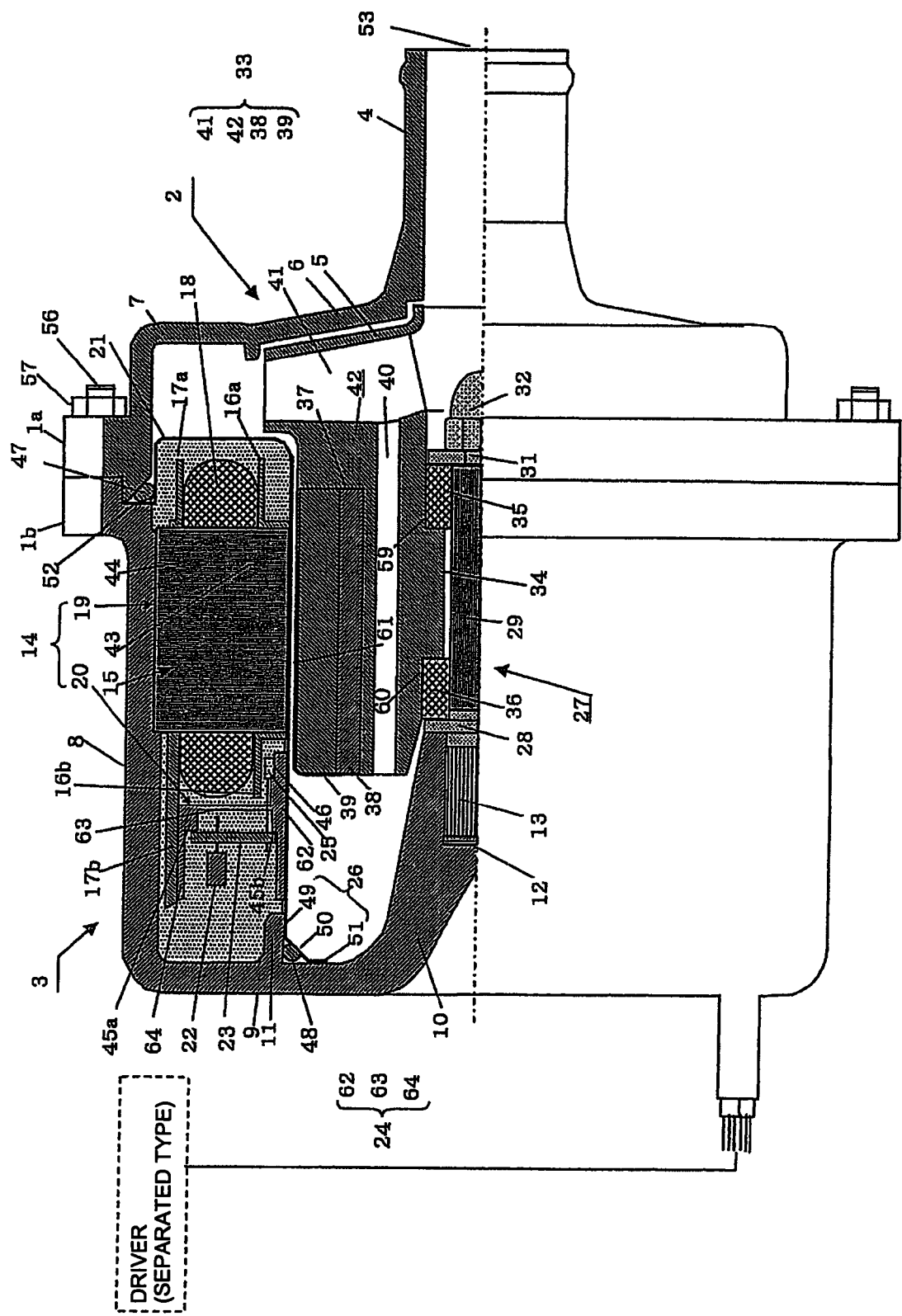
FIG. 1 is a side view of an electric pump according to an embodiment of the present invention, in which only an upper half portion is sectioned.

FIG. 1 is a side view of an electric pump according to the embodiment of the present invention, in which the upper half shows a cross section, and the lower half shows an external view.

An electric motor used in the electric pump of the present embodiment is an inner-rotor type, brushless DC motor which makes full use of sensors and a power circuit so as to cause a rotor having permanent magnets to rotate within a space surrounded by magnetic poles of a stator. Since the motor is of a brushless type, wear of brushes and mechanical loss can be eliminated, along with entrainment of foreign material such as brush powder into fluid. Further, generation of electric noise and acoustic noise, which conventional brushes generate, can be prevented. Further, since contact failure, which would otherwise occur because of wear of brushes, does not occur, maintenance work and other related work become easier. Moreover, the space for brushes can be eliminated.

Since the electric motor is of an inner-rotor type, when the motor is used in fluid, such as cooling water, the area of contact with fluid becomes relatively small, as compared with the case of an outer-rotor type motor. Therefore, water loss can be reduced, irregular rotation hardly occurs, and well-balanced rotation is attained.

Since the electric motor is of a brushless DC type, sensors for detecting the rotational angle of the rotor having permanent magnets provided thereon are incorporated, and stator coils, which will be described later, are driven and controlled, by means of, for example, bipolar drive, on the basis of position information. Therefore, the DC motor has desirable characteristics, such as a wide speed range from low speed to high speed, suppressed generation of noise, and facilitated control.

The casing of the electric pump is composed of a pump casing 2 and a main casing 3. The pump casing 2 and the main casing 3 have respective flange portions 1a and 1b, which are attached and fixed together.

The pump casing 2 has a substantially cylindrical inlet nozzle portion 4, to which a hose (not shown) is fitted in order to supply fluid to the electric pump; a substantially circular impeller cover portion 6, which faces an impeller cover 5 with a clearance formed therebetween, the impeller cover 5 connecting ends of respective impeller vanes 41; an annular flow path portion 7 extending radially outward from the impeller cover portion 6 and defining an annular flow path in cooperation with other components; an exit nozzle portion (not shown) extending from the annular flow path portion 7; and the above-mentioned annular flange portion 1a extending axially inward from the annular flow path portion 7.

The main casing 3 has the above-mentioned annular flange portion 1b; a cylindrical side wall portion 8 axially extending from the flange portion 1b; an annular bottom plate portion 9 extending radially inward from the end of the side wall portion 8 opposite the flange portion 1b; and a shaft support portion 10 axially extending from the bottom plate portion 9 toward the interior side so as to form a conical shape. An annular projection 11 is provided on the interior side of the bottom plate portion 9. A blind hole 12 is formed at the center of the shaft support portion 10. A relatively long support shaft portion 13 of a shaft 27 is fixedly fitted into the blind hole 12, whereby the shaft 27 is supported in a cantilever fashion. Since the shaft 27 is cantilevered, a bearing portion does not have to be provided at the inlet nozzle portion of the pump casing, which has been provided in conventional electric pumps, whereby flow lines of fluid can be rendered smooth to thereby improve the efficiency of the pump.

Several methods can be employed for manufacturing a sensor-stator assembly 14. For example, a stator unit 19 and a sensor unit 20 are assembled as shown in the FIG. 2, and then placed in a space between the main casing 3 formed of die-cast aluminum, and a can 21. Subsequently, by means of potting, resin in a hot melt state (heated state) is charged into the space through a resin injection opening formed in the main casing 3, thereby encapsulating the sensor-stator assembly 14. Since the main casing 3 formed of die-cast aluminum and the cap 21 have high coefficient of thermal conductivity, they quickly radiate heat; i.e., they maintain cold states (room temperature). Therefore, unlike a conventional process in which resin is heated for hardening within a die, the heated resin charged in the space between the main casing 3 and the can 21, which serve as die halves, can be rapidly cooled through heat radiation. Thus, the sensor-stator assembly 14 can be easily manufactured without use of a die. By means of the potting process, stator coils are molded concurrently. At that time, the shape of the can 21 can be changed by increasing the amount of resin injected during the potting process.

The stator unit 19 is manufactured as follows. First, a plurality of steel plates each having a shape corresponding to the cross sectional shape of the stator are stacked so as to form a stator core 15. Inner stator coil guides 16a and 16b and outer stator coil guides 17a and 17b are provided at opposite ends of the stator core 15 in such a manner that they extend axially from the corresponding ends. Stator coils 18 are wound on the stator core 15, while the stator coil guides 16a, 16b, 17a, and 17b are used as guides. In this state, the stator unit may be resin-sealed.

The sensor unit 20 includes an annular frame 24 having a cross section shaped like a backwards letter h and having stepped portions 45a, 45b, and 46 at predetermined locations; a magnetosensitive element 25 provided at the stepped portion 46; and a circuit board 23 mounted between the stepped portions 45a and 45b. Circuit elements 22 are provided on the circuit board 23, and the magnetosensitive element 25 is connected to the circuit board 23.

The sensor unit 20 assembled in this manner may be resin-sealed while being placed in a die. The frame 24 is positioned along the outer stator coil guide 17b of the stator unit 19, which extends toward the frame side.

The sensor-stator assembly 14 is accommodated within the main casing 3, while being positioned along the side wall portion 8 of the main casing 3 by means of the projection 11 of the bottom plate portion 9.

The can 21, which is formed of a resin material, a stainless steel material, or both of these materials, is disposed to cover the inner circumference and one end of the resin-sealed sensor-stator assembly 14. An annular flange 52 formed at one end of the can 21 is fluid-tightly sandwiched between the flange portion 1a of the pump casing 2 and the flange portion 1b of the main casing 3 via an O-ring 47. A press portion 26 formed at the other end of the can 21 has three continuously formed surfaces 49, 50, and 51. The surface 49 is guided by means of the projection 11 of the bottom plate portion 9. The surface 50 is pressed against an O-ring 48 for attaining fluid tightness. The surface 51 abuts the inner surface of the bottom plate portion 9. Thus is realized a canned structure (a fluid-tight structure formed by the can 21 and the O-rings 47 and 48, serving as sealing members).

The shaft 27 has the support shaft portion 13, a bearing stopper portion 28, a slide shaft portion 29, and a threaded portion 30, which are formed integrally.

The support shaft portion 13 and the slide shaft portion 29 each have a cylindrical columnar shape, and the bearing stopper portion 28 has a circular plate-like shape. A thrust washer 31 is fitted onto the threaded portion 30 of the shaft 27, and a cap nut 32 is screw-engaged with the threaded portion 30 so as to fix the thrust washer 31. Since a head portion of the cap nut 32 has a hemispherical shape, fluid taken into the pump forms smooth flow lines.

An impeller rotor 33 has bearings 35 and 36 disposed in a shaft through hole 34 of a rotor main body 42 so as to be separated from each other. A cylindrical back yoke 38 and a cylindrical magnet 39 fitted onto the back yoke 38 are fixedly fitted onto an annular stepped portion 37 of the rotor main body 42. A vent hole 40 is formed in the rotor main body 42 in such a manner that the vent hole 40 is located between the bearings 35 and 36 and the back yoke 38 and extends in parallel with the through hole 34. Base ends of the impeller vanes 41 are integrally fixed to the right-hand end face of the annular stepped portion 37 in FIG. 1 or 2. The above-mentioned impeller cover 5 is fixed to the distal ends of the impeller vanes 41 (forming a closed configuration).

Notably, the impeller may assume an open configuration in which the impeller cover 5 is omitted.

The ratio (diameter ratio) of the diameter of the rotor main body to that of the impeller preferably falls within the range of about 50% to about 100%. For example, when the diameter ratio is set to about 100% so as to make the diameters substantially the same, the height of the electric pump can be reduced, whereby the volume of the electric pump can be reduced.

Since the impeller vanes 41 and the rotor main body 42 are integrated and their diameter ratio is set within the above-mentioned range, the number of components can be reduced, and the size of the pump including the motor can be reduced.

Since the vent hole 40 is formed in the rotor main body 42, thrust load stemming from the fluid pressure difference between the opposite ends of the vent hole 40 can be reduced. This pressure difference is produced because of a difference in flow velocity of fluid.

The cylindrical bearing 36 is disposed in such a manner that its inner circumferential surface is in sliding contact with the slide shaft portion 29, and one of its end surfaces is in sliding contact with the shaft stopper portion 28. The cylindrical bearing 35 is disposed in such a manner that its inner circumferential surface is in sliding contact with the slide shaft portion 29, and one of its end surfaces is in sliding contact with the thrust washer 31. The bearings 35 and 36, which serve as submerged plain bearings utilizing a coolant as a lubricant, are fixed to the rotor main body 42 of the impeller rotor 33 while being axially separated from each other. This configuration eliminates the necessity of a shaft seal, to thereby suppress leakage of fluid, suppress mechanical loss, and extend service life.

Since the shaft 27 is cantilevered by means of the shaft support portion 10, the bearings 35 and 36 cannot be disposed symmetrically with respect to the center of the magnet 39 in the axial direction, unlike the conventional electric pump. Therefore, the bearings 35 and 36 are provided at respective positions offset toward the impeller vanes 41; i.e., shifted rightward (toward the impeller vanes) in FIG. 1 with respect to the magnet 39.

When fluid to be pumped by use of the electric pump is a coolant circulating through a radiator, components which will come into contact with the fluid, such as the impeller vanes 41 and the pump casing 2, are preferably formed of a resin resistant to long life coolant (LLC), such as LLC resistant (ethylene glycol resistant) resin, or polyphthalamide (PPA) resin. Thus, the electric pump can have an extended service life.

In the present embodiment, the electric motor is formed of a brushless direct current (DC) motor. Since the motor has no brush, no brush powder is produced, and therefore maintenance is easy. Further, since the DC motor has a large starting torque and a linear rotation characteristic, its torque control is easy. Therefore, the DC motor is more preferable than an AC motor. A driving unit for the brushless DC motor requires a Hall IC driving circuit, a Hall voltage amplification circuit, a six-phase logic circuit, and a driving circuit. Notably, in the case where the rotational position of the rotor is detected from an induced voltage, sensors can be eliminated.

Next, there will be described a power source for driving the pump having the above-described configuration. An AC generator (ACG) connected to an output shaft of an engine (not shown) generates three-phase alternating current in synchronism with rotation of the engine. This three-phase alternating current is supplied to a battery after being rectified by means of a rectifier. The battery serves as a DC power supply. Electric power is supplied from the battery to the stator coils 18 of the electric pump via a bipolar driving circuit or the like. When direct current is supplied to the stator coils 18, a rotating magnetic field is produced at stator magnetic poles 44, whereby the magnet 39, which serves as a rotor magnet, rotates in response to the rotating magnetic field. Thus, the impeller vanes 41, which are integrated with the rotor magnet, rotate.

Figure 4:
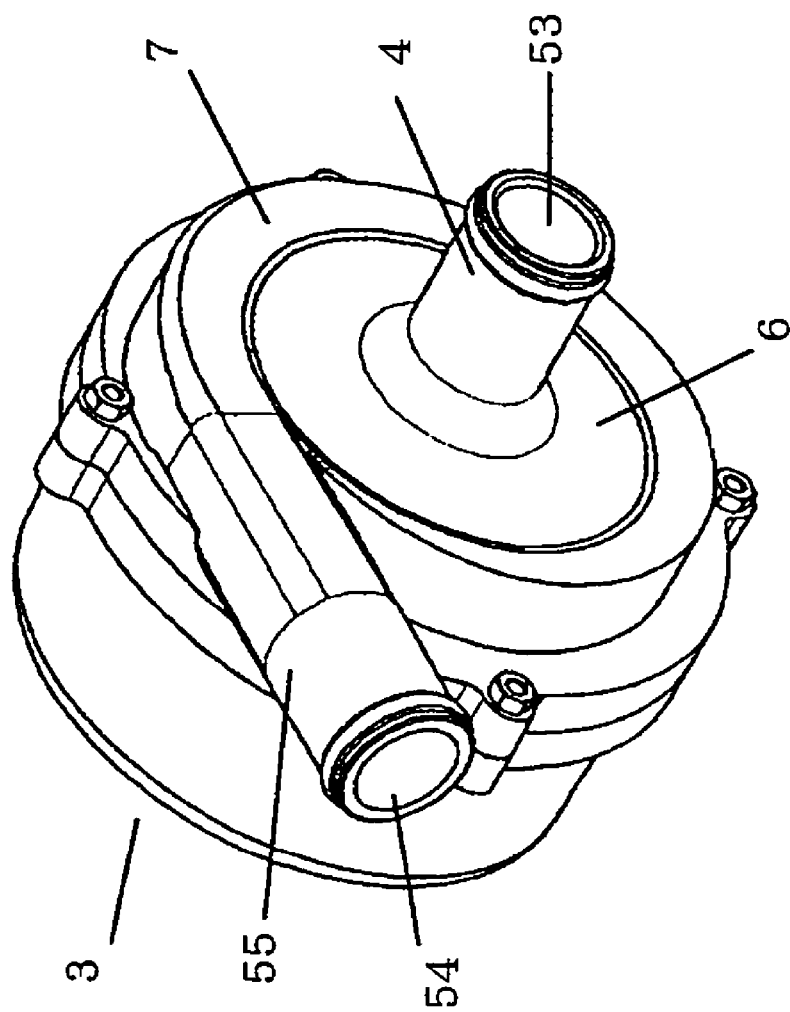
FIG. 4 is a perspective view of the electric pump of FIG. 1.
Figure 5:
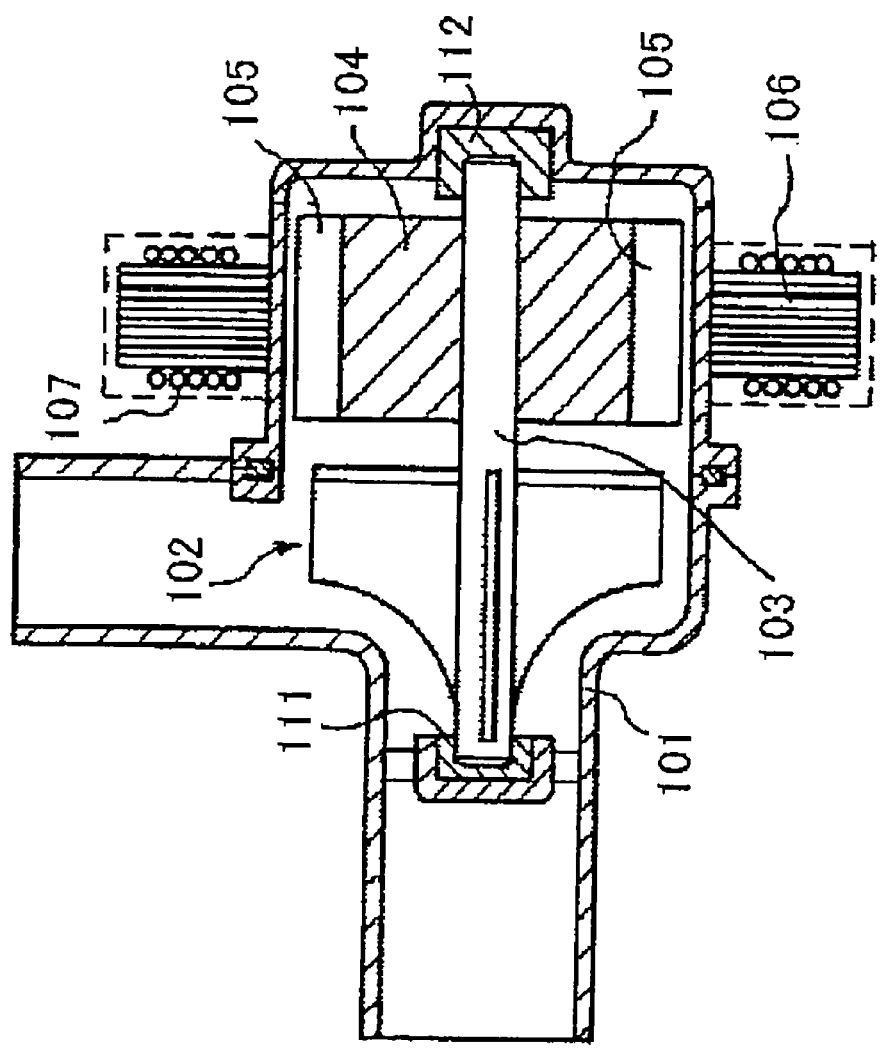
FIG. 5 is a sectional view of a conventional electric pump.

FIG. 4 is a perspective view of the electric pump of the present invention. Upon rotation of the impeller vanes 41, a coolant is introduced into the electric pump via an inlet 53, and is exited from an outlet 54. The inlet 53 and the outlet 54 are connected to jackets that are in communication with the radiator so as to circulate the coolant.

Furthermore, a power source can be made up in three ways as described below. A three-phase AC power source which DC power source is transformed by a inverter into. A DC power source which DC power source is transformed by a converter into. A DC power source which DC power source is transformed by a chopper into.

Figure 2:
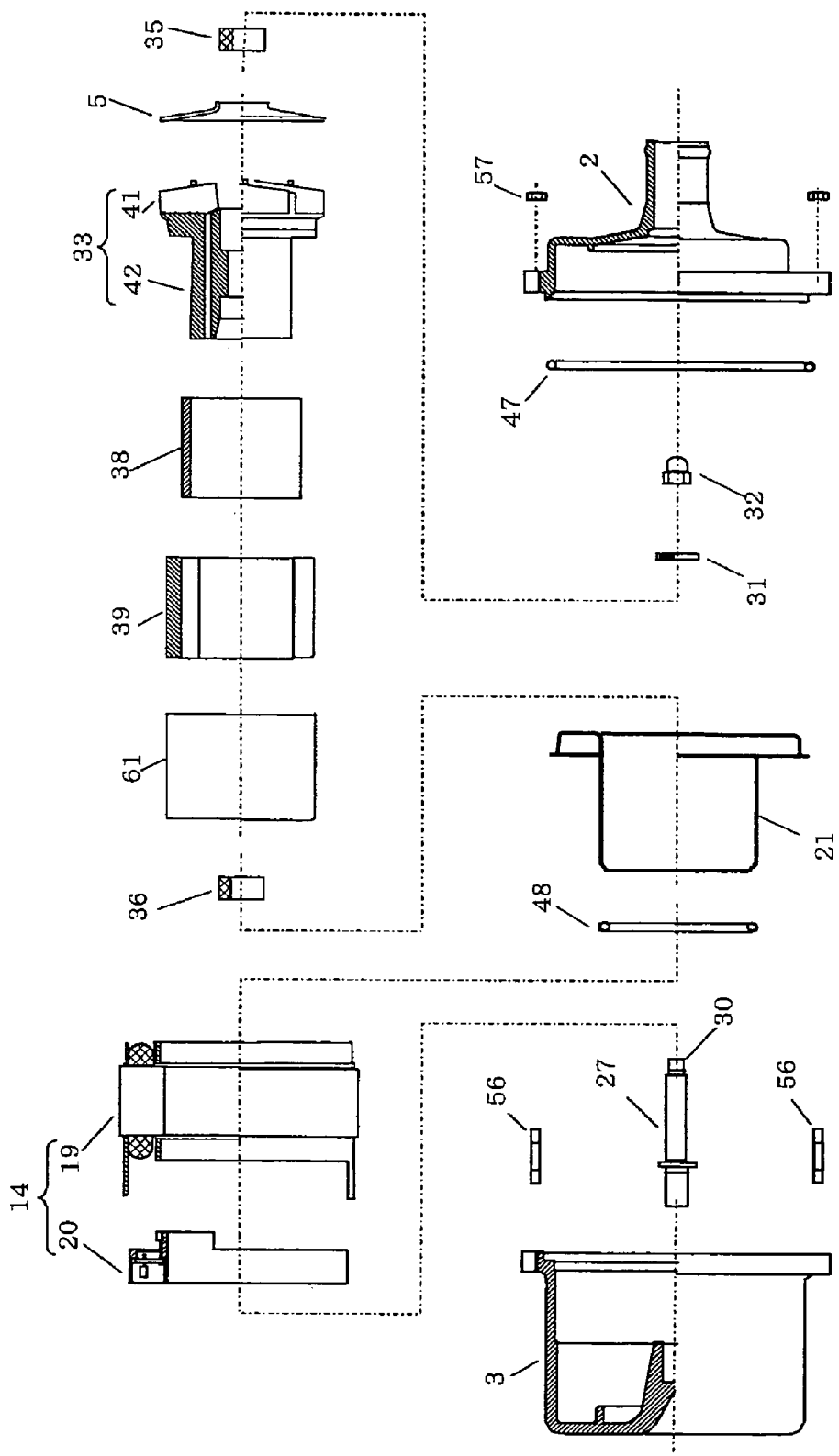
FIG. 2 is a diagram showing a process of assembling components of the electric pump of FIG. 1.

FIG. 2 shows the process of assembling the components of the electric pump according to the present invention. The details of the electric pump will be described with reference to FIG. 1.

Pump Casing:

As described above, the pump casing 2 has the substantially cylindrical inlet nozzle portion 4, to which a hose (not shown) is fitted in order to supply fluid to the electric pump; the substantially circular impeller cover portion 6, which faces the impeller cover 5 with a clearance formed therebetween, the impeller cover 5 connecting ends of the impeller vanes 41; the annular flow path portion 7 extending radially outward from the impeller cover portion 6 and defining an annular flow path in cooperation with other components; the exit nozzle portion shown in FIG. 4 extending from the annular flow path portion 7; and the annular flange portion 1a extending axially inward from the annular flow path portion 7. The pump casing 2 has an overall shape of a funnel used for pouring liquid into a bottle. In the present embodiment, the pump casing 2 is formed of a glass fiber (GF) 30% reinforced polyamide 66 (PA66). This GF30% PA66 has the following characteristics; tensile strength: 177 MPa; breaking elongation: 4.0%; bending strength: 255 MPa; bending elastic constant: 8 GPa; Izod impact value (no notch): 50 kJ/m$^2$; deflection temperature under load (18.5 kgf/cm$^2$): 255° C.; coefficient of thermal expansion (flow direction) $2.5 \times 10^{-5}$/K; volume resistivity: $10^{15}$ Ω·cm; relative dielectric constant (1 MHz): 3.8; long-term continuous use temperature range: about 70 to 100° C.

The pump casing 2 is preferably made of the above-mentioned GF30% PA66. Other examples of materials for the pump casing 2 which have a heat resistance of 100° C. or higher, a strength of 49 MPa or higher, and a bending elastic constant of 2.4 GPa or higher include polyacetal (POM), polybutylene terephthalate (PBT), polyethylene terephthalate (PET), and syndiotactic polystyrene (SPS). Other examples of materials for the pump casing 2 which have a heat resistance of 150° C. include polyphenylene sulfide (PPS), polyether-ether ketone (PEEK), liquid crystal polymer (LCP), fluorin-containing resin, polyether nitrile (PEN), and polyphthalamide (PPA).

The pump casing 2 guides fluid, such as a coolant, which is taken into through the inlet nozzle portion 4 at the center, is rotated while being pushed radially outward by means of the impeller vanes 41, and is exited from the outlet (54 in FIG. 4) via an outlet nozzle portion (55 in FIG. 4). The flange portion 1a of the pump casing 2 is fixed to the flange portion 1b of the main casing 3 by means of stud bolts 56 (which will be described later) extending through the flange portion 1a, and steel nuts 57 in screw-engagement with the stud bolts 56.

First O-Ring:

In the embodiment, the O-ring 47 is shown as an example of a typical elastic seal member. The O-ring 47 used in the embodiment has a circular cross section and an annular overall shape, and is made of, for example, silicone rubber. The O-ring 47 may have any cross section other than circular cross section, so long as the O-ring 47 can realize a fluid-tight configuration. Further, the O-ring 47 may be made of any elastic material other than silicone rubber.

Nut:

As described above, the cap nut 32 has a hemispherical head in order to cause fluid introduced from the inlet to flow radially outward along smooth flow lines after impinging on the head portion. The cap nut 32 is made of, for example, SUS (stainless steel), and is in screw-engagement with the threaded portion 30 of the shaft 27 so as to tighten and fix the thrust washer 31.

Thrust Washer:

The thrust washer 31 is made of, for example, SUS440, and is fitted onto the threaded portion 30 of the shaft 27, and serves as a retainer and a plain bearing member for the bearing 35.

First Bearing:

The bearing 35 is a long-life, submerged-type ceramic bearing which utilizes the lubricating effect of a coolant and is formed of a wear resistant ceramic such as silicon nitride ($Si_3N_4$), silicon carbide (SiC), alumina ($Al_2O_3$), or rice bran ceramic (product of Sanwa Yushi, IRBC 30/30 PF: hybrid material in which RBC is dispersed in resin). The bearing 35 has a cylindrical shape, and is in sliding contact with the shaft 27 and the thrust washer 31 via different surfaces.

Rice bran ceramic (see for example, Japanese Patent Application Laid-open (kokai) 2004-003611) is known as a resin composition which contains fine powder of RBC (RB ceramic) or CRBC (CRB ceramic) dispersed in a synthetic resin such as polyamide in an amount such that the weight ratio between the fine powder and the synthetic resin becomes 10 to 70:90 to 30. Fine powder of RBC or CRBC is mixed in a synthetic resin, which is then kneaded at a temperature near the melting point of the synthetic resin, whereby the fine powder is uniformly dispersed in the resin.

The RBC is manufactured through a process in which defatted rice bran (75% by weight) and liquid phenol resin (25% by weight) are mixed under heat, the resultant mixture is sintered, and the sintered mixture is pulverized to a particle diameter of 140 to 160 µm. The CRBC is manufactured through a process in which RBC fine powder (60% by weight) and solid phenol resin (40% by weight) are mixed under heat, the resultant mixture is sintered, and the sintered mixture is pulverized to a particle diameter of 20 to 30 µm. The above-mentioned resin composition exhibits rust-proof and low friction characteristics in water, alcohol, ethylene glycol, and a mixture thereof.

Impeller Cover:

The impeller cover 5 has the shape of a lamp shade, and connects and fixes the ends of the impeller vanes 41 opposite the rotor main body 42. The impeller cover 5 increases the attachment strength of the impeller vanes 41, and suppresses undesirable spreading of fluid stirred by the impeller vanes 41. The impeller cover 5 is formed of, for example, the above-mentioned glass fiber (GF) 30% reinforced polyamide 66 (PA66). The above-mentioned alternative materials can be used.

Impeller Rotor:

The impeller rotor 33 has the above-mentioned shaft through hole 34 at the center of the rotor main body 42. A bearing attachment stepped portion 59 is formed at a right-hand end (in FIG. 1) of the shaft through hole 34 of the rotor main body 42 so as to receive the bearing 35, and a bearing attachment stepped portion 60 is formed at a left-hand end (in FIG. 1) of the shaft through hole 34 of the rotor main body 42 so as to receive the bearing 36. Further, the annular stepped portion 37 is formed on the outer side of the rotor main body 42 in such a manner that its shoulder surface faces leftward in FIG. 1. The cylindrical back yoke 38 and the cylindrical magnet 39 are fixed onto the stepped portion 37. The base ends of the impeller vanes 41 are integrally fixed to the right-hand surface of the rotor main body 42 in FIG. 1 (the surface opposite the stepped portion 37). Notably, the impeller cover 5 is fixed to the distal ends of the impeller vanes 41. The above-mentioned vent hole 40, which is a through hole extending in parallel with the shaft through hole 34, is formed in the rotor main body 42 to be located between the attachment stepped portions 59 and 60 and the annular stepped portion 37. The vent hole 40 suppresses generation of a negative pressure stemming from a flow velocity difference. Specifically, the vent hole 40 suppresses generation of a negative pressure stemming from a difference between the flow velocity of fluid pushed out by means of the impeller vanes 41 and the flow velocity of fluid stagnating in the space surrounded by the left end of the rotor main body 42, the bottom plate portion 9 of the main casing 3, and the shaft support portion 10.

Since the radial dimension of the rotor main body 42 is rendered roughly equal to the length of the impeller vanes 41, useless volume can be reduced. Unlike conventional electric pumps in which the bearings 35 and 36 are disposed symmetrically with respect to the center of the magnet 39 in the axial direction, in the present invention, the bearings 35 and 36 are shifted rightward in FIG. 1 with respect to the conventional positions. Accordingly, the entire length as measured along the shaft direction (the horizontal direction in FIG. 1) can be shortened.

The impeller rotor 33 is formed of, for example, the above-mentioned glass fiber (GF) 30% reinforced polyamide 66 (PA66). The above-mentioned alternative materials can also be used.

Back Yoke:

The back yoke 38 has a cylindrical shape so as to allow insertion of the annular stepped portion 37 of the impeller rotor 33 into the back yoke 38. The back yoke 38 is designed such that the length of the back yoke 38 is equal to the length of the annular stepped portion 37, and the total thickness (thickness in the radial direction) of the back yoke 38 and the magnet 39 is equal to the thickness (thickness in the radial direction) of the annular stepped portion 37 of the impeller rotor 33. Since the magnet 39 is attached to the back yoke 38 and magnetic paths are formed in the back yoke 38, the back yoke 38 is formed of a corrosion resistant steel, such as a carbon steel (S25C) whose carbon content is 0.25%. The back yoke 38 is fixedly bonded to the annular stepped portion 37 of the impeller rotor 33 by means of resin or the like.

Magnet:

The magnet 39 has a cylindrical shape and an inner diameter that enables insertion of the back yoke 38 therethrough. The magnet 39 is designed such that the length of the magnet 39 is equal to the length of the annular stepped portion 37, and the total thickness (thickness in the radial direction) of the back yoke 38 and the magnet 39 is equal to the thickness (thickness in the radial direction) of the annular stepped portion 37 of the impeller rotor 33. The magnet 39 has a plurality of segments (four segments in the present embodiment), which are formed of permanent magnets so as to generate field magnetic flux. That is, the magnet segments are formed of a magnetized ferromagnetic material such as ferrite (e.g., YBM-9BE, product of Hitachi Metals, Ltd.). The magnet 39 is fixedly bonded to the outer circumferential surface of the back yoke 38 and the shoulder surface of the annular stepped portion 37 of the impeller rotor 33 by means of resin or the like. The above-mentioned alternative materials can also be used. The number of segments is freely determined in accordance with the number of stator magnetic poles.

End Cover:

An end cover 61 is formed in a substantially cup-like shape so as to closely cover the outer circumferential surface and left-hand end surface of the magnet 39 and the left-hand end surface of the back yoke 38. The end cover 61 is formed from a steel material such as SUS304 through press working. The end cover 61 is fixed to the magnet 39 and the back yoke 38 by means of resin to thereby prevent the magnet 39 and the back yoke 38 from coming off the impeller rotor 33 or scattering, and prevent the segments of the magnet from coming off or removing.

Second Bearing:

The bearing 36 is identical with the bearing 35. That is, the bearing 36 is formed of a wear resistant ceramic such as rice bran ceramic (product of Sanwa Yushi, IRBC 30/30 PF). The bearing 36 has a cylindrical shape, and is in sliding contact with the shaft 27 and the bearing stopper portion 28 via different surfaces.

Can:

The can 21 is formed of a non-magnetic resin, a non-magnetic steel material, or both of these materials, and has a wall thickness and elasticity such that the can 21 can press the O-rings 47 and 48 for establishing fluid tightness, and can press and hold the sensor-stator assembly 14. When a non-magnetic resin and a non-magnetic steel material are used, the can 21 has a layered structure in which the non-magnetic resin and the non-magnetic steel material are bonded together. Any non-magnetic resin can be used, so long as an additive(s) contained therein is non-magnetic.

An example of non-magnetic steel material is SUS304. The can 21 has a shape similar to that of a pot of a rice cooker with a bottom portion thereof removed. In the case where the can 21 is formed of SUS, the can 21 is formed of a non-magnetic SUS such as SUS304K1, SUS304KM, SUS304B, SUS304BM, or SUS304 MB, in order to prevent induced current from flowing in the can 21, which would otherwise flow because of presence of the can 21 between the stator magnetic poles 44 and the magnet 39 of the rotor main body 42.

Second O-Ring:

In the embodiment, the O-ring 48 is shown as an example of a typical elastic seal member. The O-ring 48 has the same shape as that of the O-ring 47, and is formed of the same material as that of the O-ring 47.

Figure 3:
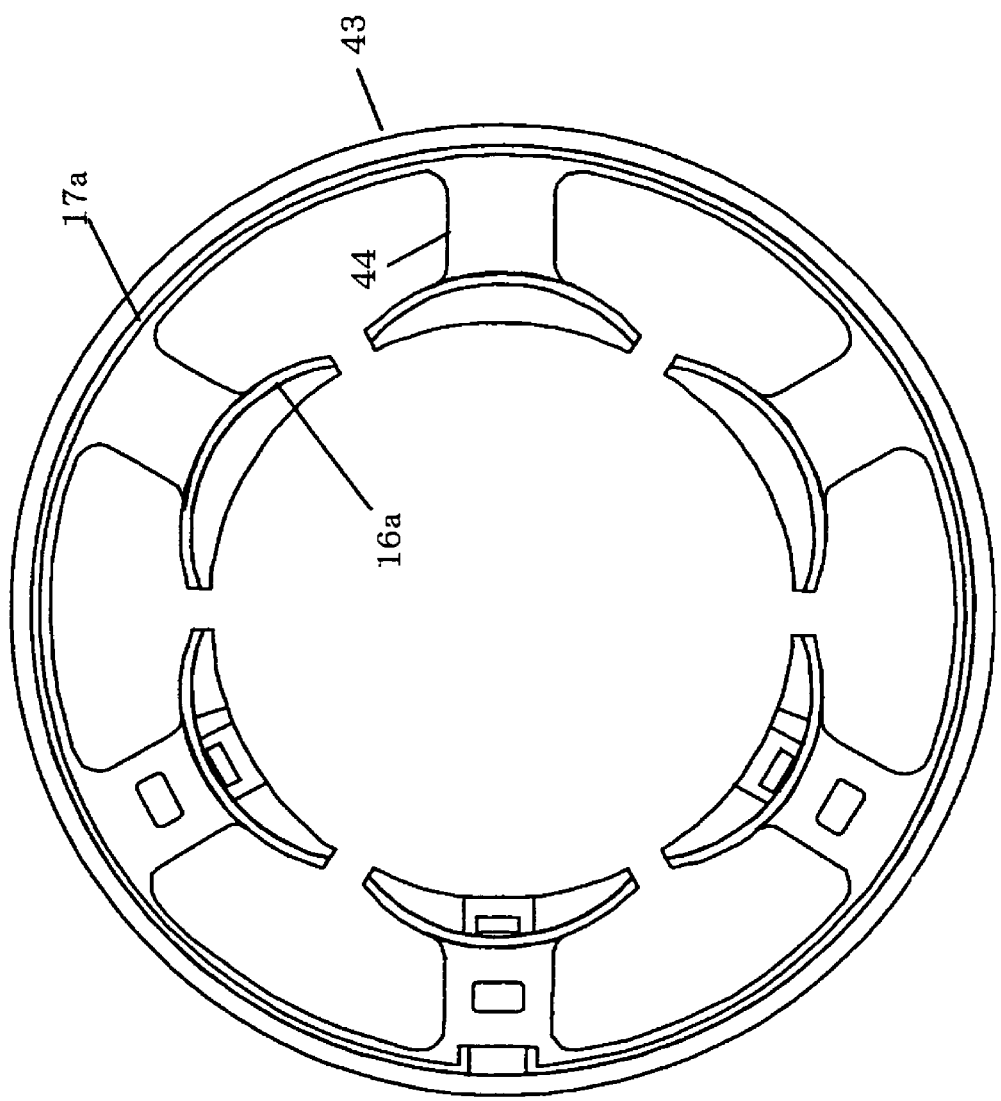
FIG. 3 is a front view of a stator of the electric pump, formed of a laminate of punched steel plates.

Stator Unit:

FIG. 3 is a front view of the stator formed of a laminate of punched steel plates. As shown in FIG. 3, in the present embodiment, the number of the stator magnetic poles 44 is six. The stator is manufactured as follows. The predetermined number of steel plates each having an annular stator yoke portion 43 and six stator magnetic poles 44 are stacked so as to form the laminated stator core 15. As described previously, the inner stator coil guides 16a and 16b and outer stator coil guides 17a and 17b are provided at opposite ends of the stator core 15 in such a manner that they extend axially from the corresponding ends. Although the left-hand stator coil guides 16b and 17b in FIG. 1, which support the sensor unit 20, cannot be omitted, the right-hand stator coil guides 16a and 17a in FIG. 1 can be omitted.

Non-oriented magnetic steel plate having an arbitrary chemical composition can be used as steel plates for the stator. For example, non-oriented magnetic steel plate 50H1300 or the like is used. The stator coils 18 are rendered rather thick in consideration of a wire diameter determined from current rating and a thickness of an insulating coating determined from a desired dielectric withstanding voltage and the degree of melting of the coating during soldering.

After the sensor unit 20 is accommodated, the stator unit 19 is resin-molded integrally with the sensor unit 20, as shown in FIG. 1.

Sensor Unit:

The sensor unit 20 includes the above-mentioned frame 24. The frame 24 has an inner wall portion 62 extending in parallel with the inner stator coil guide 16b, an outer wall portion 64 extending along and in parallel with the outer stator coil guide 17b, and a connecting wall portion 63 extending radially between the inner wall portion 62 and the outer wall portion 64. As described previously, the frame 24 has the three stepped portions 45a, 45b, and 46. The stepped portion 45a is formed on the outer wall portion 64 to be located on the left side of the connecting wall portion 63, and the stepped portion 45b is formed on the inner wall portion 62 to be located on the left side of the connecting wall portion 63. Further, the stepped portion 46 is formed on the inner wall portion 62 to be located on the right side of the connecting wall portion 63. The circuit board 23, which mounts the circuit elements 22, is supported between the stepped portions 45a and 45b. The magnetosensitive element 25, such as a Hall IC, is provided at the stepped portion 46. The lead wires of the magnetosensitive element 25 are connected to the circuit board 23.

The sensor unit 20 is assembled as follows. The sensor unit 20 is inserted into the space within the outer stator coil guide 17b, with the outer wall portion 64 of the frame 24 being guided by the outer stator coil guide 17b and the inner wall portion 62 being guided by the can 21, until the magnetosensitive element 25 moves to a location near the magnet 39. The resin molding for the thus-completed sensor-stator assembly 14 is performed in a manner as described above.

Shaft:

As described above, the shaft 27 has the support shaft portion 13, the bearing stopper portion 28, the slide shaft portion 29, and the threaded portion 30, which are formed integrally. A material which can prevent rusting and endure sliding friction with the bearings 35 and 36 is selected for the shaft 27. Examples of such material include nickel-chromium-molybdenum steel (SNCM), DD material, ASK 8000, SUS303 (austenitic stainless steel), SUJ2 (high-carbon chromium bearing steel).

The DD material (see, for example, Japanese Patent Publication (kokoku) No. H5-002734) is a stainless steel (SUS) which includes C (0.6 to 0.75% by weight), Si (0.1 to 0.8% by weight), Mn (0.3 to 0.8% by weight), Cr (10.5 to 13.5% by weight), Fe (balance), and unavoidable impurities, and in which the size of contained eutectic carbide is rendered not greater than 20 μm in terms of grain length or 10% in terms of areal ratio in cross section.

In order to improve wear resistance and sliding performance, the surface of the shaft 27 is treated with hard chrome plating, nitriding treatment, titanium carbide (TiC) coating, titanium nitride (TiN) coating, titanium aluminum nitride (TiAlN) coating, or diamond-like carbon (DLC) coating.

Stud Bolt:

The stud bolts 56 are formed of, for example, steel, and used to fix the flange portion 1a of the pump casing 2 and the flange portion 1b of the main casing 3 together.

Casing:

As described above, the main casing 3 has the annular flange portion 1b; the cylindrical side wall portion 8 axially extending from the flange portion 1b; the annular bottom plate portion 9 forming an annular bottom wall on the left-hand end of the side wall portion 8 in FIG. 1; and the shaft support portion 10 axially extending toward the center of the interior of the main casing 3 so as to form a conical shape. The annular projection 11 is provided on the interior side of the bottom plate portion 9. The main casing 3 is formed of, for example, die-casting aluminum alloy (ADC 12).

Controller:

A circuit unit for processing a detection signal from the sensor and a controller (driver) for the brushless DC motor are disposed away from the electric pump and connected to the electric pump via a cable.

The electric pump of the present invention is configured from the above-described components. Each of the above-described components may be replaced with an alternative component, so long as the selected alternative component satisfies corresponding requirements in terms of characteristics, material, function, and configuration.

When the electric pump of the present invention is mounted on an electric vehicle or a hybrid vehicle, which have enjoyed rapid progress, good fuel economy is expected to increase.

Obviously, numerous modifications and variations of the present invention are possible in light of the above teachings. It is therefore to be understood that within the scope of the appended claims, the present invention may be practiced otherwise than as specifically described herein.

What is claimed is:

1. An electric pump using an inner-rotor type, brushless DC motor, wherein a casing of the electric pump is formed by a pump casing and a main casing; a sensor-stator assembly is disposed in a space between a side wall portion of the main casing and a can and is sealed with resin; a first elastic seal member is disposed, in a fluid-tight and compressed manner, between the can and the main casing; a second elastic seal member is disposed, in a fluid-tight and compressed manner, between the pump casing and the main casing; the pump casing and the main casing are fixed together; and wherein a shaft support portion is provided at a bottom plate portion of the main casing in such a manner that the shaft support portion projects toward the center of the interior of the main casing;

a support shaft portion of a shaft is fixed and cantilevered to a blind hole formed in the shaft support portion;

and a bearing is provided on a slide shaft portion of the shaft;

wherein impeller vanes are integrally provided on a rotor main body of the inner-rotor type, brushless DC motor and a vent hole is formed in the rotor main body, the vent hole penetrating the rotor main body in a direction parallel to the shaft to provide fluid communication from a space behind said rotor main body to a space in front of said rotor main body;

wherein an annular projection is provided on the interior side of the bottom plate portion;

wherein the can has a wall thickness and elasticity such that the can is configured to press the first and second elastic seal members for establishing fluid tightness, and to press and hold the sensor-stator assembly; and wherein a press portion is formed at one end of the can, having three continuously formed surfaces including a first surface, a second surface and a third surface; the first surface being guided by means of the projection of the bottom plate portion, the second surface being pressed against a first the first elastic seal member for attaining fluid tightness, and the third surface abutting the inner surface of the bottom plate portion.

2. An electric pump according to claim 1, wherein a bearing of the inner-rotor type, brushless DC motor is a submerged-type ceramic bearing which exhibits a lubrication effect when immersed in a coolant.

3. An electric pump according to claim 2, wherein the submerged-type ceramic bearing is formed of silicon nitride, silicon carbide, alumina, or rice bran ceramic.

4. An electric pump according to claim 1, wherein the shaft is formed of a material selected from the group consisting of nickel-chromium-molybdenum steel, DD material, ASK 8000, SUS303, SUJ2.

5. An electric pump according to claim 1, wherein the surface of the shaft is treated with hard chrome plating, nitriding treatment, titanium carbide coating, titanium nitride coating, titanium aluminum nitride coating, or diamond-like carbon coating.

6. An electric pump according to claim 1, wherein the impeller vanes are connected together by an impeller cover.

7. An electric pump according to claim 1, wherein the pump casing guides fluid which is taken into through an inlet nozzle portion at the center of the pump casing, is rotated while being pushed radially outward by means of the impeller vanes, and is exited from an outlet via an outlet nozzle portion of the pump casing, and the vent hole suppresses generation of a negative pressure stemming from a difference between the flow velocity of fluid pushed out by means of the impeller vanes and the flow velocity of fluid stagnating in the space surrounded by the end of the rotor main body, the bottom plate portion of the main casing, and the shaft support portion.

8. An electric pump according to claim 1, wherein a cylindrical yoke and a cylindrical magnet are integrally fitted onto an annular stepped portion of the rotor main body; and an end cover is fitted onto the yoke and the magnet so as to prevent the yoke and the magnet from separating from the rotor main body.

9. An electric pump accordingly to claim 1, wherein the shaft fixed to the blind hole has a bearing stopper portion having a circular plate shape.

10. An electric pump accordingly to claim 9, wherein the end of the shaft distal to the end of the shaft fixed to the blind hole is capped with a cap nut having a hemispherical shape.

* * * * *

UNITED STATES PATENT AND TRADEMARK OFFICE
CERTIFICATE OF CORRECTION

| | | |
|---|---|---|
| PATENT NO. | : 7,896,626 B2 | |
| APPLICATION NO. | : 11/017766 | |
| DATED | : March 1, 2011 | |
| INVENTOR(S) | : Yukio Shibuya et al. | |

It is certified that error appears in the above-identified patent and that said Letters Patent is hereby corrected as shown below:

On the Title Page

Inventor name as addressed on patent delete "I" after Shibuya and before et al.

Under Inventor names at Item (75) delete "I" after Yukio Shibuya

Signed and Sealed this
Nineteenth Day of April, 2011

David J. Kappos
*Director of the United States Patent and Trademark Office*